UNITED STATES PATENT OFFICE.

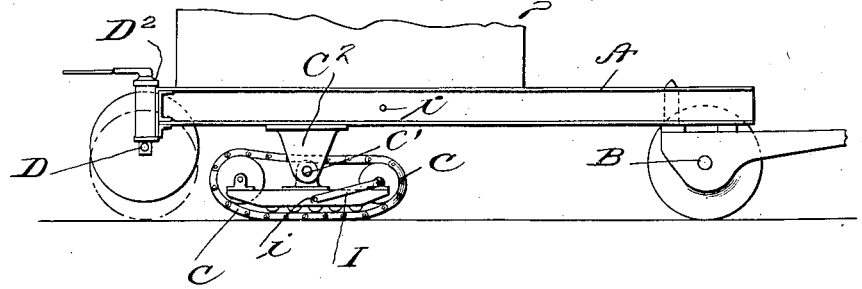
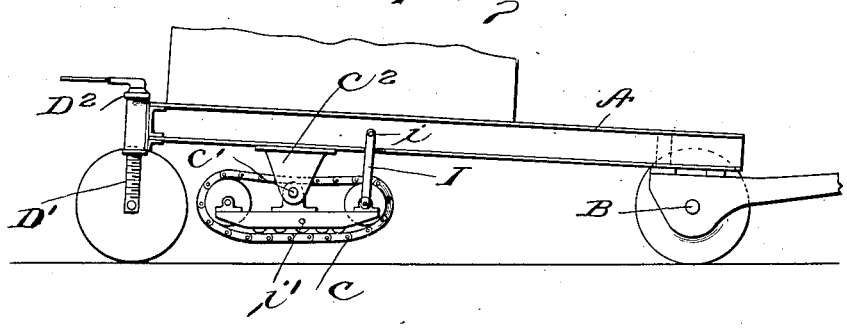
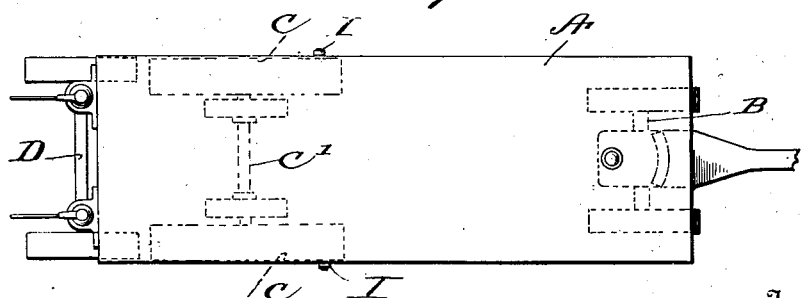

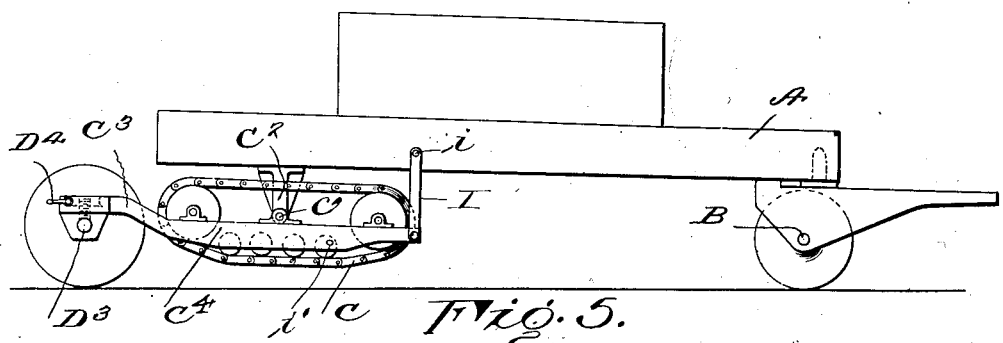
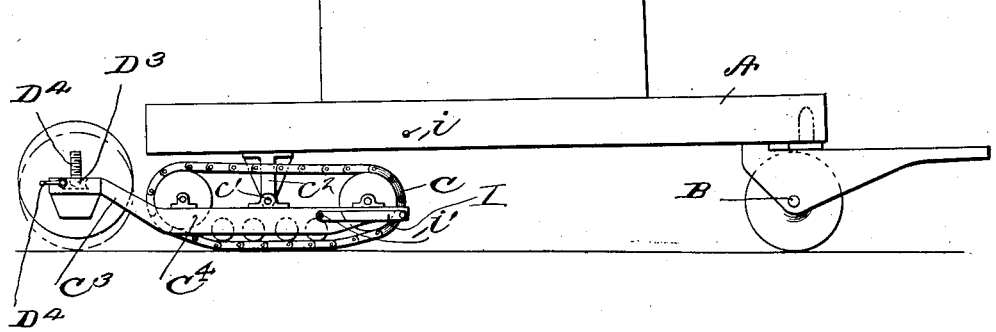
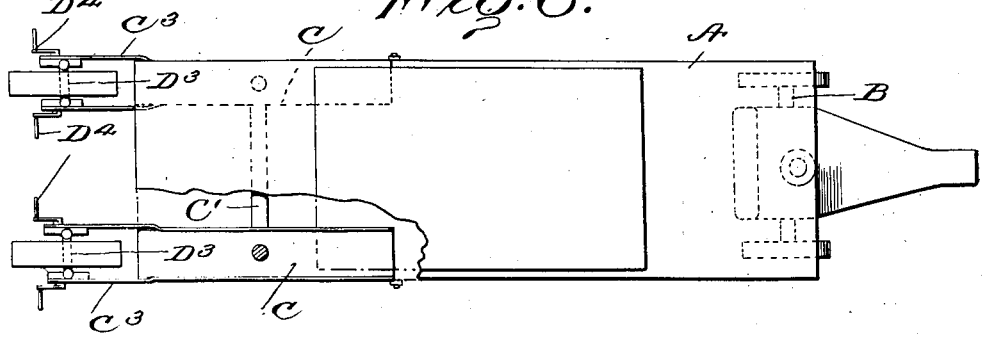

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

TRACTOR-VEHICLE.

1,376,649.  Specification of Letters Patent.  Patented May 3, 1921.

Original application filed September 6, 1917, Serial No. 189,950. Divided and this application filed February 28, 1919. Serial No. 279,871.

*To all whom it may concern:*

Be it known that I, EUGÈNE SCHNEIDER, a citizen of the Republic of France, and a resident of Paris, France, have invented a new and useful Improvement in Tractor-Vehicles, which invention is fully set forth in the following specification.

This invention relates to tractor vehicles in which endless tracks or treads have received numerous applications for enabling heavy vehicles to roll over rough ground and ground that is not very firm. The principal drawback of such tractors is the great inconvenience occasioned thereby when the vehicle has to pass over hard ground. On such ground the endless tracks or treads are subjected to shocks which damage the joints and cause rapid wear. Furthermore, the endless tracks or treads hinder the speed of travel over hard ground because in such case it would be possible to move at an increased speed of travel by employing exclusively the usual means of rolling.

The present invention has for its object to provide an improved combination of means for remedying these objections. In my application Serial No. 189,950, filed September 6, 1917, of which the present application is a division, I have shown and claimed efficient means for accomplishing this result, and the present invention consists of an, improved specific construction with the same object in view.

As herein described and claimed, the invention consists in the combination of trucks carrying endless tracks or treads capable of being raised relatively to the carriage frame with auxiliary wheeled axles also capable of being raised relatively to the carriage frame, means for raising said trucks and wheeled axles consisting of screw-jack elements one of which is connected to the auxiliary axle and the other to the trucks or the underframing of the vehicle, as may be desired.

In the accompanying drawings illustrating the invention—

Figure 1 is a diagrammatic side elevation showing the endless tracks resting on the ground;

Fig. 2 is a like elevation with the endless tracks raised from the ground;

Fig. 3 is a plan view of Figs. 1 and 2;

Fig. 4 is a side elevation of another form of the invention showing the endless tracks raised from the ground;

Fig. 5 is a like view showing the endless tracks resting on the ground; and

Fig. 6 is a plan view of Figs. 4 and 5.

Referring to Figs. 1, 2 and 3, A is a vehicle underframing or platform, or other corresponding member for a gun carriage of a gun of large caliber. This framing rests at one end upon a fore axle B which may be independent of the vehicle or may be permanently connected thereto. The rear supporting means, which constitute a part of this invention, are two trucks carrying endless tracks C which may be raised relatively to an auxiliary wheeled axle D which in turn can be raised and lowered relatively to the gun carriage framing or gun carriage member A. A cross-member C' connects the two trucks carrying endless tracks C, C together, said cross-member being supported in, downwardly extending elements $C^2$. Connected to the auxiliary axle D is one member D' of a screw jack, the other member $D^2$ of which is mounted upon and connected to the framing or platform A. Preferably there are two of these jacks employed as will be understood from an inspection of Fig. 3.

Referring to Fig. 1, the lowering of the rear wheeled axle D into the position required to bring the wheels first into contact with the ground (which position is indicated by dotted lines in Fig. 1) allows, by continuing to actuate the screw jacks in the same direction, of raising the whole carriage framing, together with the trucks, into the position shown, in Fig. 2. The trucks, when so raised, may be held in place by means of hooked rods I which may be hooked onto the carriage framing at *i* when the tractors are to be raised, or may be hooked onto the tractor trucks at *i'* when the tractors are at rest upon the ground as in Fig. 1.

It is to be observed that the trucks carrying the endless tracks are oscillative in vertical planes parallel to the longitudinal axis of the vehicle. This oscillative movement of the trucks not only permits the endless tracks to ride easily over obstructions in the road, but also permits movement of the trucks to accommodate the angular movement (pivoting on the front wheeled axle) of the vehicle frame as the latter is raised or lowered at its rear end by the vertical adjustment of the auxiliary wheeled axle. For instance, as the vehicle frame is lowered the trucks can turn on their pivots so that the treads of the endless tracks will make a flat contact with the surface of the ground, irrespective of any inclination in the surface of the ground and the angular displacement of the frame.

In the embodiment of the invention illustrated in Figs. 4, 5 and 6, the trucks C⁴ of the tractors are provided with rearward extensions C³, C³, and a pair of rear axles D³, D³ are mounted one in each of said rear extensions and one member of a screw-jack is connected with the axles, the other member of said jack being mounted upon the said rear extension C³ provided with any suitable means, as the cranks D⁴, for operating the same to raise and lower the auxiliary axle and the tractors respectively.

In this instance, it will be seen that the auxiliary rear wheeled axles are carried by two jack elements whose complementary elements are carried by the trucks of the endless tracks suitably extended rearward for this purpose.

By operating the screw-jacks in the desired direction, the vehicle may be made to rest upon the front wheeled axle B and the endless tracks C as shown in full lines in Fig. 5, or may be caused to rest simultaneously on the endless tracks and the auxiliary wheeled axles B—D as illustrated in dotted lines in Fig. 5. Upon the further actuation of the members of the jack-screws, however, the vehicle may be raised, employing the auxiliary rear wheeled axles as a fulcrum, and thus raise the tractors entirely off the ground as illustrated in Fig. 4.

It will be observed that in each of the two embodiments of the invention illustrated respectively in Figs. 1, 2 and 3 on the one hand and in Figs. 4, 5 and 6 on the other, the raisable auxiliary rear wheeled axle is carried by screw-jack elements, complementary elements of which are carried by the underframing of the vehicle, said complementary elements in Figs. 1, 2 and 3 being connected directly to the underframing, whereas in Figs. 4, 5 and 6 said complementary elements are connected indirectly to the underframing of the vehicle through the traction trucks.

What is claimed is:—

1. In a vehicle having an underframing and a front wheeled axle, the combination of a pair of trucks carrying endless tracks with each truck pivoted approximately midway of its length to the underframing so as to be oscillative thereon, adjustable means to prevent oscillation of the trucks, and a vertically adjustable auxiliary wheeled axle connected to the underframing for raising and lowering the vehicle to move the endless tracks to and from the ground.

2. In a vehicle having an underframing and a front wheeled axle, downwardly extending elements on the underframing, a cross-member extending between the downwardly extending elements, a pair of trucks carrying endless tracks with each truck pivoted approximately midway of its length on the cross-member so as to be oscillative relatively to the vehicle, adjustable means to prevent oscillation of the trucks, and a vertically adjustable auxiliary wheeled axle connected to the underframing for raising and lowering the vehicle to move the endless tracks to and from the ground.

3. In a vehicle having an underframing and a front wheeled axle, the combination of a truck carrying an endless track pivoted between its ends to the underframing to oscillate thereon and having a rearward extension, an auxiliary wheeled axle mounted in the rear extension of the truck, means for raising and lowering the auxiliary wheeled axle relatively to the rear extension of the truck, and adjustable means to prevent oscillation of the truck on its pivot during the raising and lowering of the auxiliary wheeled axle.

4. In a vehicle having an underframing and a front wheeled axle, the combination of a truck carrying an endless track pivoted between its ends to the underframing to oscillate thereon and having a rearward extension, an auxiliary wheeled axle mounted in the rear extension of the truck, a screw-jack element carrying the auxiliary wheeled axle with its complementary element carried by the rearward extension of the truck, and adjustable means to prevent oscillation of the truck on its pivot during the raising and lowering of the auxiliary wheeled axle by the screw-jack elements.

5. In a vehicle having an underframing and a front wheeled axle, the combination of a pair of trucks carrying endless tracks independently pivoted between their ends to the underframing to oscillate thereon and each having a rearward extension, an auxiliary wheeled axle mounted in each rear extension, individual means for raising and lowering each auxiliary wheeled axle relatively to the rear extension carrying it, and individual adjustable means to prevent oscillation of each truck on its pivot during the raising and lowering of the auxiliary wheeled axle carried by its rear extension.

In testimony whereof I have signed this specification.

EUGÈNE SCHNEIDER.